(12) United States Patent
Bot et al.

(10) Patent No.: US 8,571,563 B2
(45) Date of Patent: *Oct. 29, 2013

(54) METHOD OF CONDITIONALLY ROUTING A CALL MADE TO A FIXED TELEPHONE NUMBER

(75) Inventors: Jan Bot, Nieuwendijk (NL); Antoine Den Brok, Rijen (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 852 days.

This patent is subject to a terminal disclaimer.

(21) Appl. No.: 12/513,142

(22) PCT Filed: Apr. 27, 2007

(86) PCT No.: PCT/NL2007/050188
§ 371 (c)(1),
(2), (4) Date: Apr. 30, 2010

(87) PCT Pub. No.: WO2008/054201
PCT Pub. Date: May 8, 2008

(65) Prior Publication Data
US 2010/0172333 A1 Jul. 8, 2010

(30) Foreign Application Priority Data
Nov. 3, 2006 (NL) ................ PCT/NL2006/050279

(51) Int. Cl.
*H04W 40/00* (2009.01)

(52) U.S. Cl.
USPC ......... 455/445; 455/412.1; 455/413; 455/417

(58) Field of Classification Search
USPC ........ 455/412.1, 413, 417, 422.1, 432.3, 433, 455/445
See application file for complete search history.

(56) References Cited

U.S. PATENT DOCUMENTS

| 6,215,790 | B1 * | 4/2001 | Voit et al. ...................... 370/401 |
| 7,656,864 | B2 * | 2/2010 | McNiff et al. ................. 370/352 |
| 2003/0235173 | A1 | 12/2003 | Wood |
| 2004/0203680 | A1 * | 10/2004 | Sylvain ......................... 455/417 |
| 2006/0159073 | A1 | 7/2006 | Chun |
| 2006/0233338 | A1 | 10/2006 | Punaganti Venkata |
| 2010/0173620 | A1 * | 7/2010 | Hicks, III ..................... 455/417 |

FOREIGN PATENT DOCUMENTS

| EP | 1 804 435 A | 7/2007 |
| WO | WO 00/13449 A | 3/2000 |
| WO | WO 03/005741 A | 1/2003 |

OTHER PUBLICATIONS

Backstrom. M. et al. Mobile@Home-GSM Services Over Wireless LAN Ericsson: Ericsson Review No. 2, 2005.

* cited by examiner

*Primary Examiner* — Temica M Beamer

(57) ABSTRACT

The invention relates to a method of routing a call made by a calling party to a fixed telephone number of a called party, wherein the call is routed to one or more mobile terminals (34) via an Internet Protocol network (12) and a wireless access point (10) associated with the fixed telephone number if the one or more mobile terminals (34) are located in an area covered by the wireless access point (10), or to an alternative terminating point if the one or more mobile terminals (34) are located outside the area. A specific Service Control Point is arranged to store a list that comprises alternative terminating points for the calls to the fixed number.

23 Claims, 4 Drawing Sheets

METHOD OF CONDITIONALLY ROUTING A CALL MADE TO A FIXED TELEPHONE NUMBER

TECHNICAL FIELD

The present invention relates to a method of routing a call made to a fixed telephone number. In a further aspect, the present invention relates to a telecommunication network and a service node arranged to execute (part of) the method.

BACKGROUND

Recently, mobile telephone services were introduced wherein a subscriber only needs one single mobile phone that is suitable for calling via VOIP and via GSM/UMTS. If the subscriber resides at home, she may call via a radio based connection like WLAN, WIFI, Bluetooth. These radio based connections are collectively denoted as UMA (Unlicensed Mobile Access). GSM, UMTS and the like are denoted as GAN (Global Access Networks). Phones capable of connection in both UMA and GAN are denoted as UMA/GAN phones. For a subscriber to use the phones capabilities she needs to have either GAN and UMA subscriptions or a combined UMA/GAN subscription.

If an UMA/GAN subscriber is out of reach of an UMA area, she will call via the GSM/UMTS network. In order to call the subscriber, a mobile telephone number has to be dialed which is most of the time more expensive than dialing to a fixed number.

Most people still use their fixed telephone numbers next to their mobile telephone. If they are called at their fixed number, they may forward the calls to their mobile number using a rerouting service. If they dial a prefix, such as for example dialing *21, and then the mobile number, all calls to the fixed number are forwarded to the corresponding mobile phone. In this way, they will always be reached. Part of the cost for the forwarded calls may however be billed to the called party.

SUMMARY OF THE INVENTION

A goal of the present invention is to provide a method of routing calls which makes it possible for a called party to use a fixed telephone number and to receive the calls at a mobile phone, while reducing costs for the called party as compared to the present methods.

This goal is achieved by providing a method of routing a call made by a calling party to a fixed telephone number of a called party, wherein said call is routed to one or more mobile terminals via an Internet Protocol network and a wireless access point associated with said fixed telephone number if said one or more mobile terminals are located in an area covered by said wireless access point, or to a predetermined alternative terminating point if said one or more mobile terminals are located outside said area.

The predetermined alternative terminating point may comprise an answering service or another telephone number.

In an embodiment, if a first mobile terminal associated with said fixed telephone number is not in said predefined area, not switched on or, has no connection left, said call is routed to a second mobile terminal associated with said fixed telephone number if said second mobile terminal is in the predefined area.

In another embodiment, the call is routed to every mobile terminal associated with said fixed telephone number and present in said area.

In yet another embodiment, if said one or more mobile terminals are located outside said area, but said calling party is on a hot list, said call is routed to a mobile telephone number associated with said fixed telephone number.

According to an embodiment, if said calling party is calling with a calling party mobile terminal, said call is routed via said IP network only if said calling party mobile terminal is connected via a further wireless access point.

Information on whether said one or more mobile terminals are located inside or outside said area is received from a Home Base Station Controller. Alternatively, it may be received from a Home Location Register by means of subscription or Any Time Interrogation. It may as well be received from a Secure Gateway.

BRIEF DESCRIPTION OF THE DRAWINGS

The present invention will be discussed in more detail below, using a number of exemplary embodiments, with reference to the attached drawings, in which.

DETAILED DESCRIPTION OF EXEMPLARY EMBODIMENTS

The basic idea of the present invention is to provide subscribers with a fixed telephone number the facility to route calls that are made to the fixed telephone number either to a mobile phone of the subscribers when they are located in a so-called 'Home Zone', or else to an alternative terminating point, such as a voice mail of the subscriber that may reside in the telecommunication network of a telecom provider. The Home Zone, according to an embodiment, is determined by an area which is covered by one or more wireless access points. The service which is provided to the subscribers is referred to as the '@home' service. The method according to the invention will give an @home-subscriber and a calling party a fixed line kind of experience.

Figure 1:
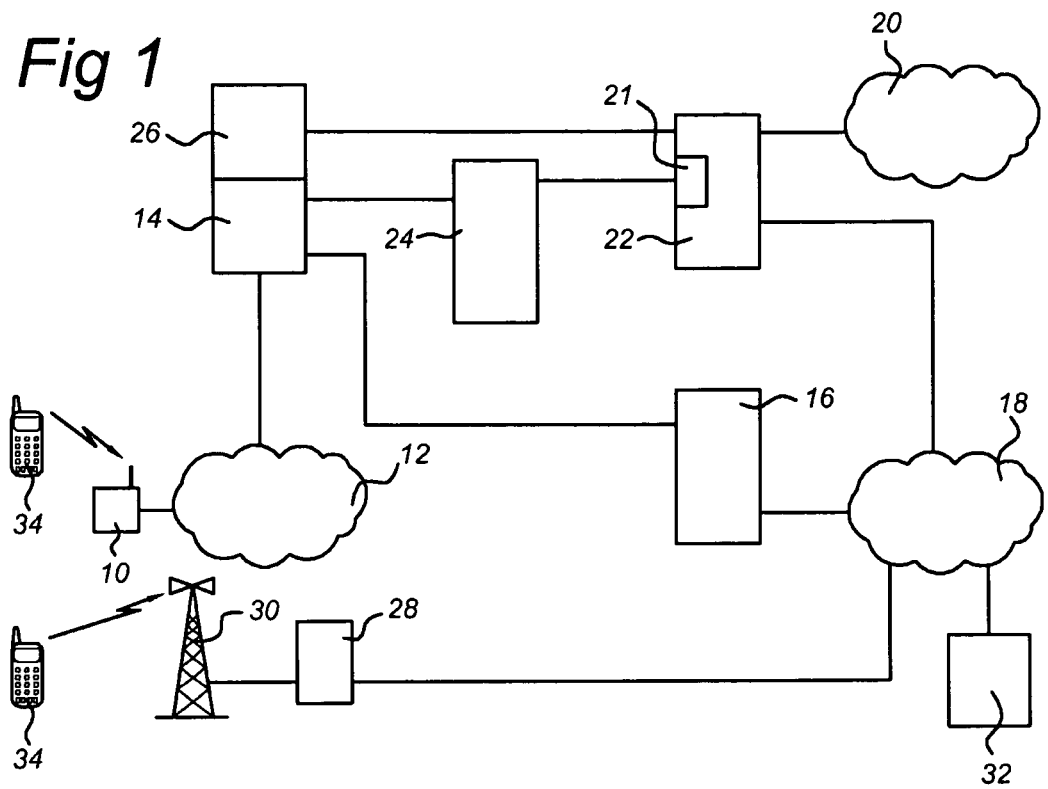
FIG. 1 shows a network diagram which depicts a telecommunication network according to an embodiment of the invention.

In FIG. 1, a network diagram is shown which depicts a telecommunication network according to an embodiment of the invention. The telecommunication network comprises a wireless access point 10, such as a WiFi enabled modem installed at the subscriber premises, an Internet Protocol (IP) network 12, a Security Gateway (SeGW) 14, a Home Base Station Controller (HBSC) 16, a Mobile telephone network 18, and a fixed telephone network 20. Furthermore, the telecommunication network comprises a Telephony switch 22, Service Control Point (SCP) 24, a Media GateWay (MGW) 26. The telecommunication network also comprises a Base Station Controller (BSC) 28 and a Base Transmission Service (BTS) 30.

In this embodiment, a Service Switching Point (SSP) 21 is arranged in the Telephony switch 22. A database, not shown, is arranged for comprising information needed by the SCP 24 for routing purposes. The database may be arranged in the SCP 24, as a separate database like a Service Data Point (SDP), or arranged in another node in the network.

In FIG. 1, a mobile terminal 34 is depicted which is arranged to communicate both via said wireless access point 10 and said BTS 30. An example of such a mobile phone 34 is a UMA/GAN capable handset which is presently available on the market.

The Security Gateway 14 is arranged to setup a secure tunnel through the IP network 12 via the assess point 10 to the mobile terminal 34. In FIG. 1, the SeGW 14 and the MGW 26 are depicted as separate nodes, but they may as well be combined in one node.

The HBSC 16 is arranged to register alternative access possibilities of UMA/GAN subscribers. The HBSC 16 communicates with the Mobile telephone network 18 using the Mobile Application Protocol, and at the other end it communicates with the SeGW 14. The Mobile telephone network 18 is arranged for providing telecommunication services for GSM subscribers. The Telephony switch 22 is arranged to switch Time Division Multiplexing (TDM) traffic. It should be noted that in FIG. 1 the Telephony switch 22 is depicted separate from the fixed telephone network 20, while in fact it can be seen is being part of the fixed telephone network. The SCP 24 is an IN node that executes IN services. This IN node provides the subscribers to be called to their fixed telephone number while receiving the calls on a mobile phone according to the method described below. The SSP 21 in the Telephony switch 22 triggers the SCP 24 whenever a connection needs to be set up to the fixed number. To set up a connection, at the signalling level, a phone number is transmitted via the network. There are three basic ways the SSP 21 can select which called numbers to forward to the SCP. First is known as "all B or all query" In this case the SSP 21 will forward every called number to the SCP 24. Alternatively, the SSP 21 comprises a list of phone numbers for which the SSP 21 does not directly connect the call to the destination, but first accesses the SCP 24 to check whether the final destination is correct. Instead of the called number also the range in which the called number is or the subscription class of the called number may be used. If for example, a called party has forwarded all the calls to another number, the SSP 21 will ask the SCP 24 for every call to which number the call needs to be connected.

The SSP 21 will receive the correct number from the SCP 24 and will establish a connection to the correct number. Please note that the term 'number' is not necessary the same as telephone number. A voice mail box associated with a telephone number will have in the network a different 'number' than the telephone.

The SSP 21 will receive the request for setting up a connection from the network, and then the SSP 21 gives the request as a "Initial DP" message to the SCP 24.

The Telephony switch 22 communicates with the MGW 26, the fixed telephone network 20, and with the Mobile telephone network 18 using the ISDN User Part for controlling the routing of the call and TDM for the actual voice path. The SSP 21 in the Telephony switch 22 communicates with the SCP 24 using the INAP (Intelligent Network Application Part) protocol. The MGW 26 is arranged to convert VoIP traffic received from the IP network 12 to TDM traffic for the Telephony switch 22. The MGW 26 communicates with the IP network 12 using the well known Session Initiation Protocol. The BSC 28 communicates to the Mobile telephone network 18 (i.e. a Mobile Switching centre in said Mobile telephone network 18) using the so-called Base Station System Application Part (BSSAP) protocol. The SeGW 14 communicates with the IP network using IP. It is noted that other protocols may be used as will be clear to the skilled person.

Figure 2:
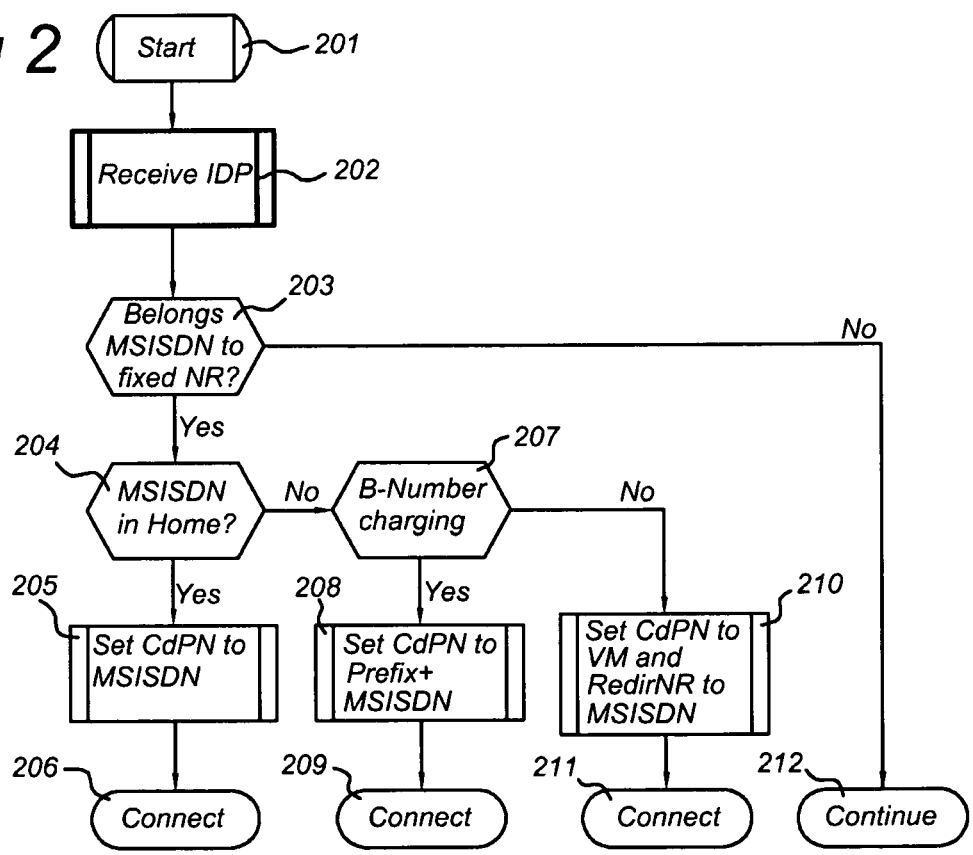
FIG. 2 shows a flow chart of actions taken by an SCP according to an embodiment.

Now different call flows will be discussed with reference to FIGS. 2-8. It is noted that the description of FIGS. 2-8 are exemplary, and that other embodiments are possible. Calls to a fixed telephone number of the subscriber will be routed by the provider of the fixed telephone network 20 to the Telephony switch 22. All incoming calls for the fixed number concerned on the Telephony switch 22 will trigger IN (via IN all query or comparable mechanism). FIG. 2 shows a flow chart of the actions performed by the IN service executed on the SCP 24 according to an embodiment. After the start, see step 201, the SCP 24 receives an InitialDP message, see step 202. The SCP 24 will execute a first check, see step 203, by querying the database, to see if there is a relation between the fixed telephone number and a Mobile Subscriber Integrate Service Digital Network number (MSISDN)). The SCP 24 receives the CalleD Party Number (CDPN) from the Telephony switch 22 in the InitialDP message. Based on this CDPN the first check is made. In case an MSISDN does exist for the CDPN, the SCP 24 executes a second check, see step 204, to test if this @home subscriber is located in the Home Zone or not. If the @home subscriber is located in the Home Zone, the MSISDN will be used as the CDPN, see step 205. Next, the SCP 24 will send a Connect message, also referred to as a routing order, comprising the CDPN (i.e. MSISDN) to the SSP 21 in the Telephony switch 22, see step 206. If however the @home subscriber is not located in the Home Zone, then a third test follows in which the SCP 24 checks whether for the specific subscriber a boolean value 'B-number charging' is TRUE, see step 207. This boolean value may be stored in the SCP 24 itself or in any other suitable network node accessible by the SCP 24. If the B-number charging is TRUE, the CdPN is set to the MSISDN of the subscriber plus a prefix in front, see step 208. An example of the content of the prefix is '9999'. The SCP 24 will then send a Connect message to the Telephony switch 22, see step 209. If the parameter 'B-Number charging' is FALSE, the SCP will set the CdPN to a voice mail number associated with the called subscriber, see step 210. Next, the SCP 24 sends a Connect message to the Telephony switch 22, see step 211, said Connect message comprising the voice mail number. It should be noted that instead of connecting to a voice mail platform, the SCP 24 may direct the call to a predetermined mobile or fixed telephone number.

If in step 203, see FIG. 2, the SCP 24 finds that there is no MSISDN associated with the fixed number dialed, it will send a Continue message to the Telephony switch 22, see step 212. In that case a call towards the fixed telephone number will be established.

The SCP 24 is arranged to receive information on whether the @home subscriber is located in or outside the Home Zone from a so-called area presence service.

In an embodiment, the SCP 24 receives the information about the location from the SeGW 14. The SeGW 14 is arranged to indicate by means of a push action if and when a subscriber registers and de-registers on the SeGW 14. In an embodiment, the Syslog protocol is used for that and this protocol allows the SeGW 14 to send event notification messages across the IP connection between the SeGW 14 and the SCP 24 or other possible Event Message Collectors—also known as Syslog Servers. The SeGW 14 is arranged to send certain event notification messages (for example UMA in and UMA out) to a specific Syslog server, such as the SCP 24. In an embodiment, a Java application may be loaded on an additional server, in which the application receives the event notification messages and convert the received messages (indicating registering and deregistering) and message information (IMSI value) to Lightweight Directory Access Protocol (LDAP) so that a Home Zone indicator in the database can be updated for a certain subscriber. The additional server may be for example a SUN server located between the SCP 24 and the SeGW 14, not shown in FIG. 1. It should be noted that the Java application may instead be loaded on the SCP 24 or on the SeGW 14.

In another embodiment, the SCP 24 receives information about the location (in or out the Home Zone) from the HBSC 16. In this case, the SCP 24 will receive update messages from the HBSC 16 that give the necessary information. The mobile terminal 34 is then registered as out the Home Zone, when there is no connection.

In an other embodiment the SCP 24 receives the entry or exit updates for the Home zone by means of subscription or ATI (any time interrogation) from a Home Location Register (HLR) not shown.

Figure 3:
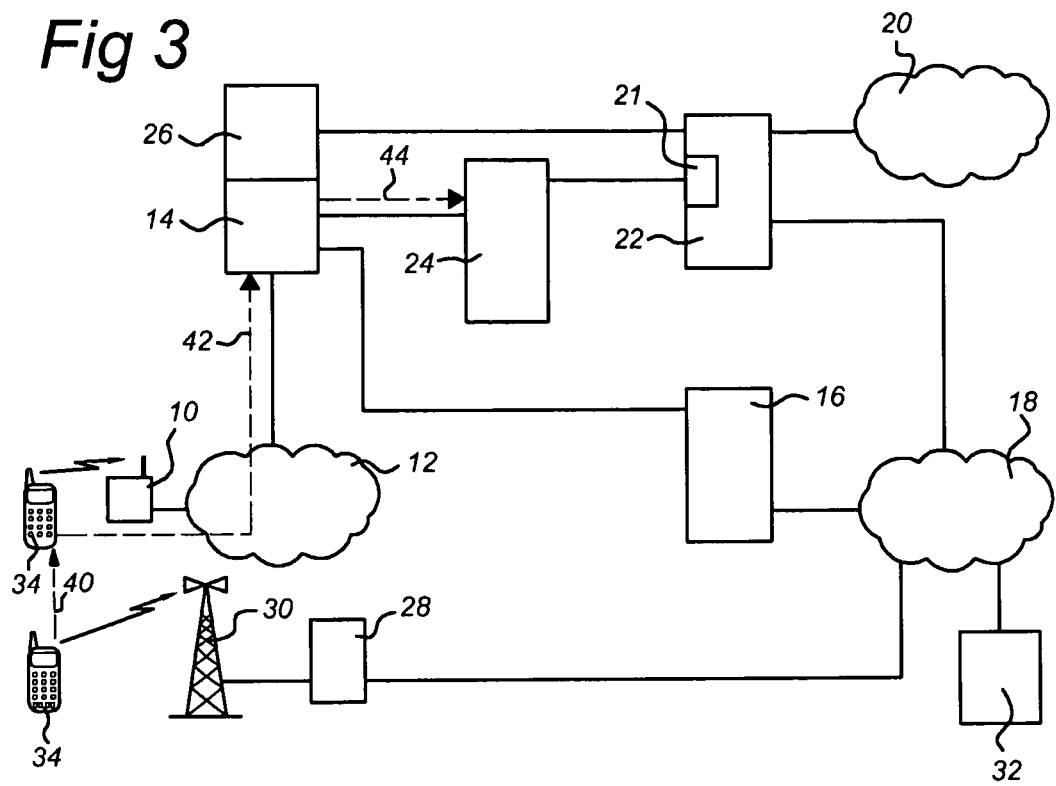
FIG. 3 shows data traffic in the telecommunication network when a @home subscriber is entering a Home Zone.

FIG. 3 shows data traffic in the telecommunication network when the @home subscriber is entering the Home Zone, see arrow 40 which indicates a movement of the mobile terminal 34 into a Home Zone. It can be seen that the mobile terminal 34 on entering the Home Zone registers on the SeGW 14, see arrow 42, and that the SCP 24 is informed about this event, see arrow 44. The message sent to the SCP 24 will indicate registration or de-registration.

Therefore a link is made in the SCP 24 between the fixed telephone number and the MSISDN or IMSI to be able to store whether the @home subscriber is located in the Home Zone or not.

Figure 4:
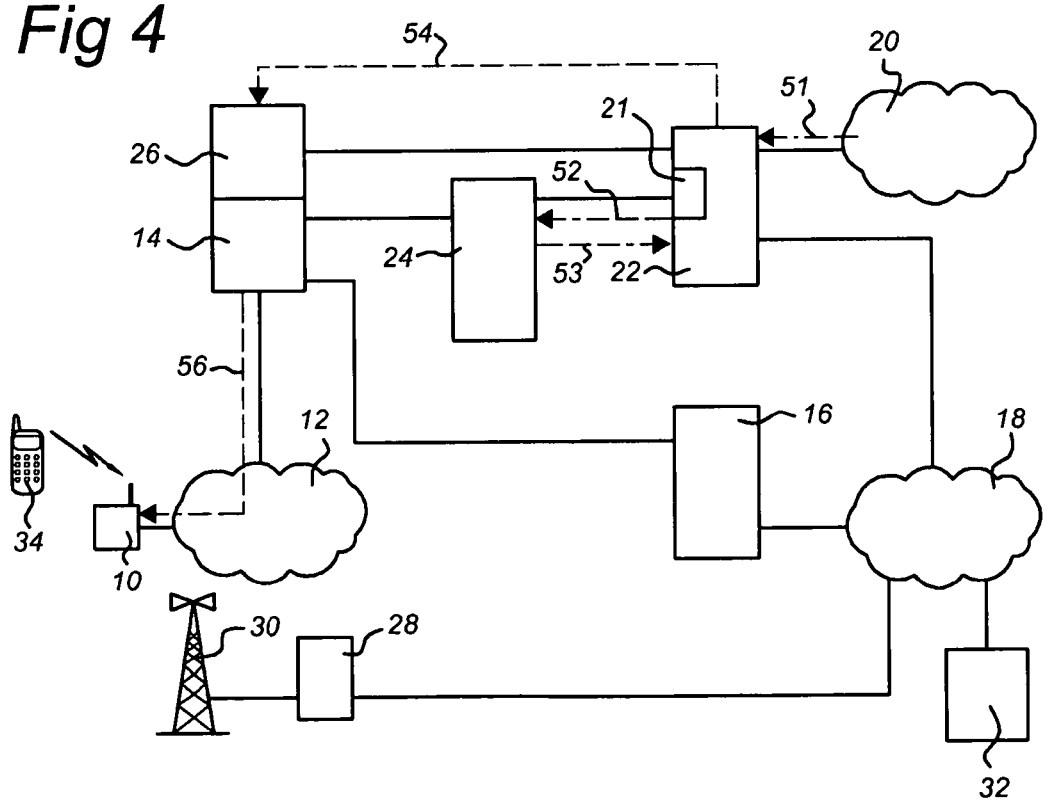
FIG. 4 shows the situation of the telecommunication network in which a check reveals that the @home subscriber of an incoming call is located in the Home Zone.
Figure 5:
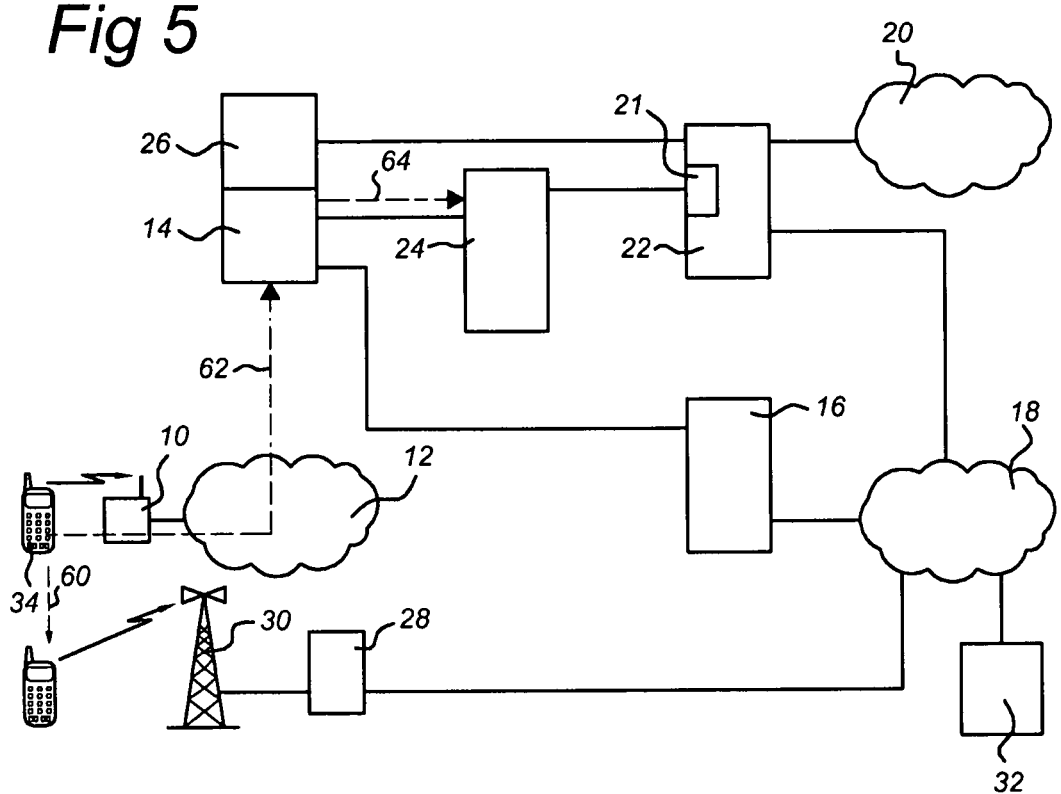
FIG. 5 shows the situation of the telecommunication network when the subscriber is leaving the Home Zone.

In the situation in which the second check reveals that the @home subscriber of an incoming call, see arrows 51 in FIG. 4, is located in the Home Zone, the SCP 24 will instruct the Telephony switch 22 via the SSP 21 to route the incoming call to the MGW 26, see arrow 54. I.e. the SCP 24 will send a Connect message to the SSP 21 in the Telephony switch 22, see arrow 53, with the MSISDN of the @home subscriber. This MSISDN will be then used as the CDPN. The CallinG Party Number (CGPN) will not be touched. The telephony switch 22 of the called party will route the call to the MGW 26 (controlled by the SSP 21 in the Telephony switch 22) which in turn will route to the mobile terminal 34 through the IPsec tunnel, see arrow 56, from the SeGW 14 to the mobile terminal 34. In the above described scenario, the subscriber resided in the Home Zone. In FIG. 5, the subscriber is leaving the Home Zone, see arrow 60. It can be seen that the mobile terminal 34 in that case deregisters from the SeGW 14 and that the SCP 24 is informed about this event, see arrows 62, 64. Arrow 62 is in this case the breaking of the IPsec tunnel in the situations 'no connection left' or 'mobile switched of'. The SeGW 14 will report this by means of an UMA out message to the HBSC 16 and in this embodiment also to the SCP 24 via the Java application.

In the following table, an example is given of the list that is stored on or by the SCP 24. The list comprises for all subscribers to the @home service, a fixed telephone number, such as "B1fixed", one or more associated areas, such as "area1", "area2", and one or more associated terminating points, such as "C1 associated endpoint". Furthermore, for each fixed telephone number, a alternative terminating point is predetermined. An area presence indicator "area in/out" is stored and updated for all associated terminating points. An update occurs when a mobile telephone corresponding to the associated terminating point, enters or leaves an area.

The value of the presence indicator for the predetermined alternative terminating point is always "in". In the example shown below, a call to the fixed telephone number "B1fixed" will be routed to "C2 predetermined alternative endpoint" when the mobile terminal of the subscriber (and thus the subscriber herself) is in none of the associated areas (i.e. not in area 1 nor in area2). An example of such a combination of areas is a coverage area defined by a plurality of WLANs.

| | | |
|---|---|---|
| B1fixed | area1 or area 2 | presence |
| | C1 associated endpoint | in/out |
| | C2 predetermined alternative endpoint | "in" |
| B2fixed | area3 | presence |
| | C5 associated endpoint | in/out |
| | C6 associated endpoint | in/out |
| | C7 predetermined alternative endpoint | "in" |

In the example of the list above, it can be seen that the subscriber of "B2fixed" has only one area which defines the Home Zone. The alternative terminating point "C7 alternative endpoint" may for example be a voice mail, or another alternative number, which is reached if the subscriber is not in "area3".

Figure 6:
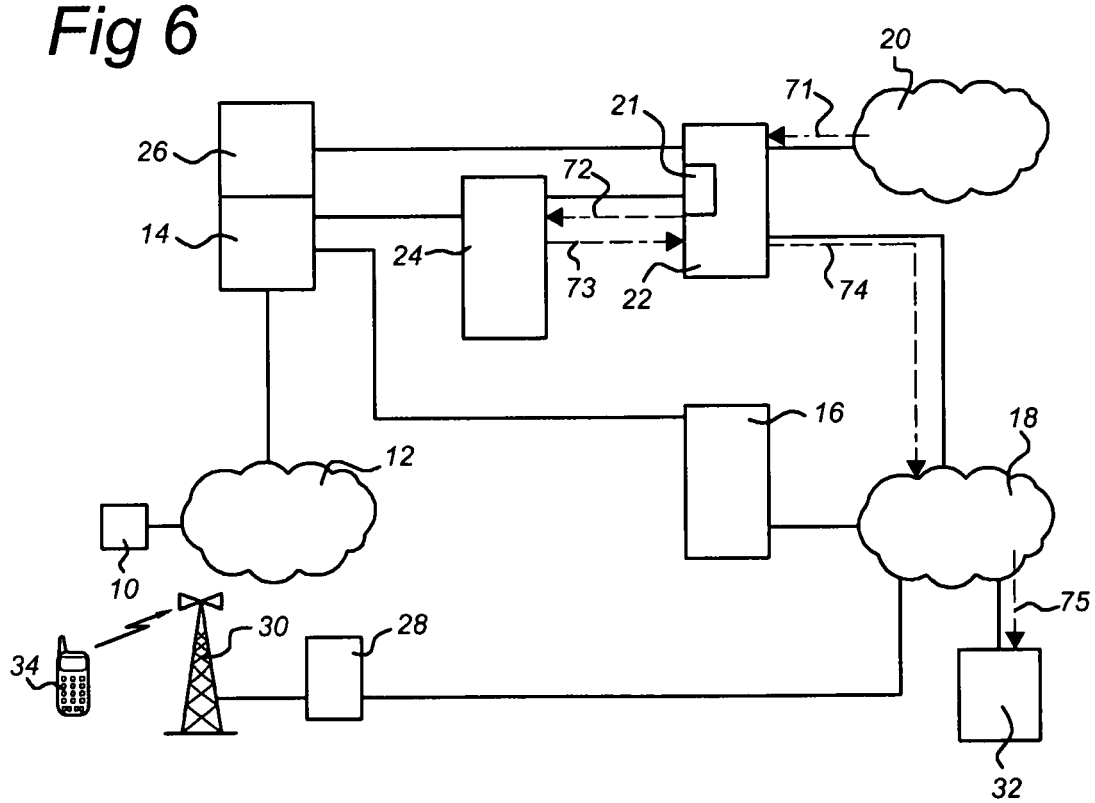
FIG. 6 shows an example of the telecommunication network in the situation in which the subscriber is not in the Home Zone.

FIG. 6 shows an example of the telecommunication network in the situation in which the subscriber is not in the Home Zone. In this case, the second check will reveal that the subscriber is no longer located in the Home Zone. In this case the SCP 24 will instruct the SSP 21 in the Telephony switch 22 to route the incoming call, see arrow 71 and 72, to alternative termination point by means of a "connect" message. The alternative terminating point can be a voicemail of the mobile terminal 34, implemented on voice mail platform 32 of the subscriber that may be located in the mobile network of the provider. The alternative terminating point may also be a number of an answering service, the voice mail of the fixed number. Each of these possible alternative terminating points are uniquely identified by a CDPN. The SCP 24 will send a Connect message to the Telephony switch 22, see arrow 73, with the telephone number of the voice mail platform 32 in Mobile telephone network 18. This telephone number will be used as the CDPN. As the voice mail platform 32 needs to know to which voice mail the call needs to be directed to, according to an embodiment, the Redirecting Number (RN) is set to the MSISDN number of the subscriber. This means that the CGPN will not be touched. Note that it is assumed that the voicemail platform 32 makes use of an RN to be able to determine the correct voicemail for a particular subscriber. Alternative to RN is super imposed digits to internal network numbers. Internal numbers have than more digits then the actual mobile or fixed number. Arrow 74 indicates the connection to the mobile telephone network 18, and arrow 75 indicates the connection to the voice mail platform 32.

Figure 7:
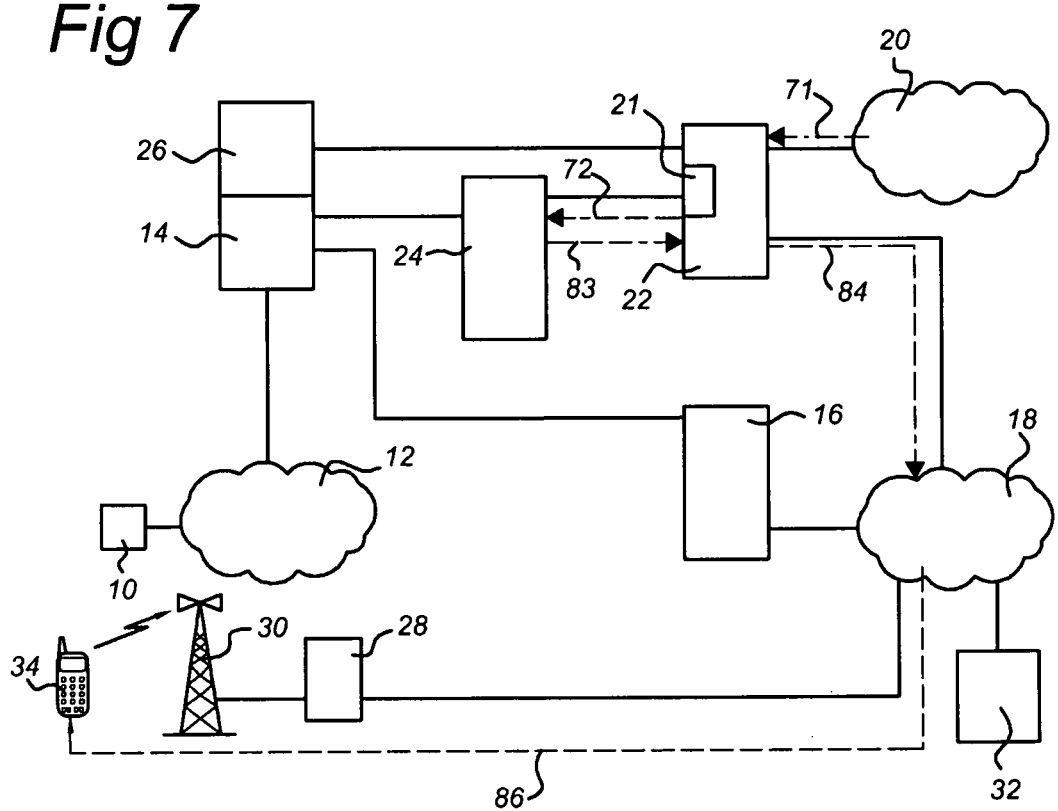
FIG. 7 shows an example of the telecommunication network in the situation in which the subscriber is not in the Home Zone but where she activated the B-number charging option.
Figure 8:
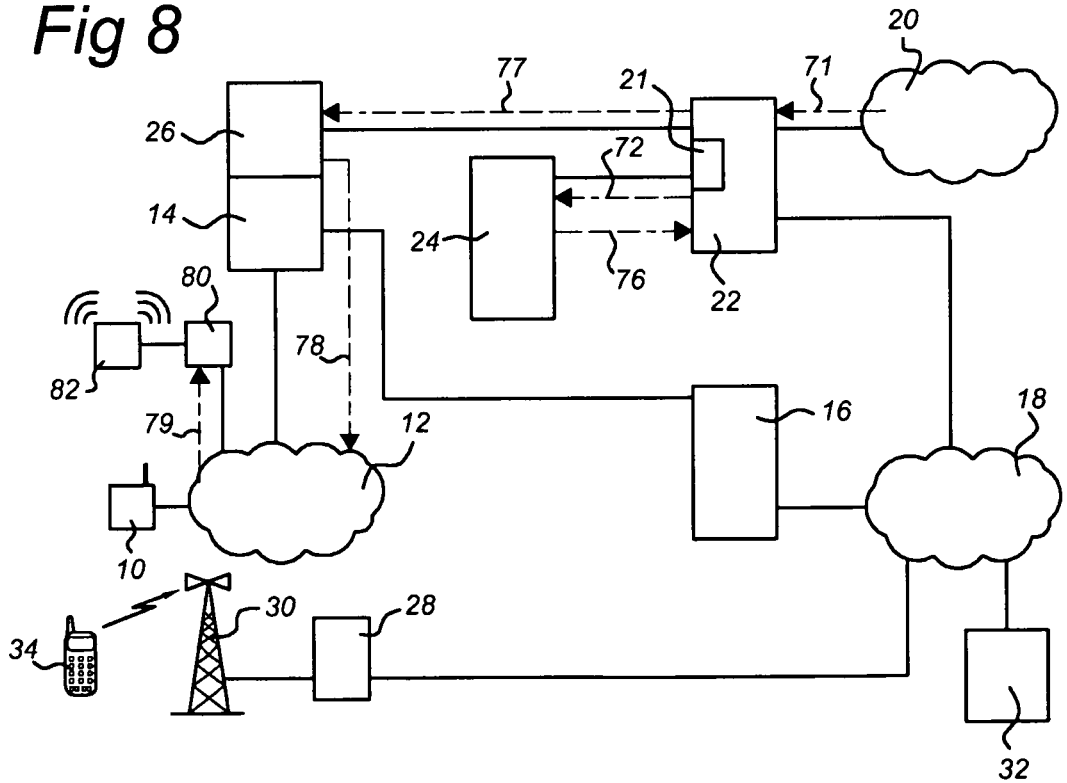
FIG. 8 shows an example of a telecommunication network handling a call to a fixed number that belongs to broadband subscriber.

FIG. 7 shows an example of the telecommunication network in the situation in which the subscriber is not in the Home Zone by wherein she has activated the B-number charging option. If the B-number charging is activated, the party receiving the call, i.e. the B-party, will have to pay. So if an @home subscriber wants to receive calls made to her fixed number, while she is not at home, the B-number charging option can be set to the value TRUE so that calls will be forwarded in a proper way. In this case, the second check, see also step 204 of FIG. 2, will reveal that the subscriber is not located in the Home Zone. In this case the SCP 24 will check a B-number charging field in the database and will see that this field has value TRUE. Now, the SCP 24 will instruct the Telephony switch 22 to route the incoming call, see arrow 71 and 72, to the MSISDN of the @home subscriber. The SCP 24 will send a Connect message to the Telephony switch 22, see arrow 83, with the ISDN number and a prefix indicating that this call is routed for a B-party that is not at home but will pay the costs for the connection for the Telephony switch to the Mobile station 34. The prefix and the ISDN are stored in the CDPN and are send to the Telephony switch 22, see arrow 83. Arrow 84 indicates the connection to the mobile telephone network 18, and arrow 86 indicates the connection to the mobile terminal 34 of the subscriber.

In an embodiment, the prefix has a specific value indicating that the subscriber has a prepaid subscription. Once the Telephony switch 22 receives such a prefix, it will active a Prepaid service executed on a SCP dealing with prepaid charging.

According to an embodiment, on the additional server a Java application is loaded in order to support the @home service described above. The additional server may be a SUN server located between the SCP 24 and the SeGW 14. The Java application is arranged so as to give the additional server the ability to:

receive Syslog messages;
filter on MessageIDs in Syslog messages—convert a combination of MessageID and information in the Syslog message (IMSI) to LDAP to be able to change the setting of the Home Zone indicator for a certain subscriber in the database that is used by the IN service.

According to an embodiment, the SCP 24 is arranged to store the database. In the database, the relation between fixed telephone number, MSISDN/IMSI and Home Zone Indicator (In/Out) is stored. Furthermore, the SCP 24 is arranged to provide the possibility for a link between the fixed number, the MSISDN/IMSI to be changed remotely. This is for example applicable when a mobile number changes. The SCP 24 has therefore a link to a Customer Business Support System (BSS) not shown.

The following information has to be provisioned for a subscriber: fixed telephone number, MSISDN, IMSI, B-Number charging (YES/NO). Provisioning of this information may be done by means of Customer Administration Interface (CAI) scripts and LDAP.

In an embodiment, the Home Zone indicator is set to 'out' by default to indicate that the subscriber is outside the Home Zone.

It is noted that next to calls to the subscribers of a '@home' service, also calls to VoIP subscribers of that operator may be routed to the Telephony switch 22. In this case, a distinction must be made between the two traffic streams. This may also be done by the SCP 24. For example, if the relation between fixed number and MSISDN does not exist then the SCP 24 may assume that the call is destined to a subscriber with a regular fixed number without the @home service.

The SCP 24 will send a Continue message to the Telephony switch 22, see arrow 76, indicating to route the call on to the regular fixed number, see arrows 77, 78, 79. This call will then be terminated by for example a broadband modem 80 and a phone 82 in communication with said modem 80, see FIG. 8.

It should be appreciated that the method described above can also be used for routing calls made to a fixed number belonging to employees of a certain company. Instead of the @home service, a service provided to companies may be called @office. In an office, a plurality access point may be present. A call to a fixed number of an employee of the company will then be routed to a mobile terminal of the employee, if the employee is within reach of one of the access points in the office. If the employee is out of the office, i.e. out of reach of the plurality of access points, the call will be routed to an alternative terminating point.

In an embodiment of the invention, the alternative terminating point comprises an answering service. The answering service may be the voice mail platform 32 shown in FIG. 6, or a call back service. It may also be an answering system that only plays an announcement for the calling party. By routing the calls to the answering service, the called party will not be billed for any forwarded call to his mobile, e.g. mobile telephone.

According to another embodiment, the alternative terminating point comprises another (i.e. a different) telephone number. This may be a fixed, a fixed IP number or a mobile number, such as a further mobile terminal in communication with said Internet Protocol network 12. In this case the further mobile terminal is also arranged to receive calls via WiFi/WLAN. This mobile terminal may be a mobile phone of an attendant or colleague of the subscriber.

In an embodiment, the SCP 24 is arranged to store a so-called 'hunting list' for each fixed telephone number for which the service is provided. If a first mobile terminal associated with the fixed telephone number is not in the predefined area or not switched on, the call is routed to a second mobile terminal associated with said fixed telephone number. The hunting list may be defined by the subscriber. The subscriber may for example get access to a website of the provider in order to enter the hunting list. The hunting list comprises the MSISDN numbers of the mobile phones of the persons entered by the subscriber. If none of these persons (i.e. their mobile phones) are in the predefined area, the call will be routed to the predetermined alternative terminating point, such as the answering service. An example of a hunting list is shown in the table above, see "B2fixed" and the associated terminating points C5 and C6.

In another embodiment, the call is routed to every mobile terminal associated with the fixed telephone number and present in the Home Zone. This means that the call will result in a parallel ringing of the mobile phones present in the Home Zone. The call will be connect to the mobile phone of the person that first picks up the phone.

According to yet another embodiment, the call is routed to a mobile telephone number associated with the fixed telephone number if the mobile terminal 34 is located outside the Home Zone, but the calling party is on a so-called 'hot list'. In this case, the call is forwarded via e.g. a GSM/UMTS network if the calling party number is on the hot list. The subscriber may for example put her husband or her mother on the hot list so that these persons will not be connected to an answering service.

According to a special embodiment, it is checked if the calling party is connected to a wireless access point. If the calling party is calling with a mobile terminal to the fixed telephone number, the call is routed via the IP network 12 only if the mobile terminal of the calling party is connected via a wireless access point. In this embodiment, the SCP 24 receives in the INAP initial DP message both the calling party number (CGPN) as well as the called party number (CDPN). The SCP 24 will then check whether the calling party is in or out his Home Zone according to a method similar to the one described above for the check for the called party.

The present invention has been explained above with reference to a number of exemplary embodiments. As will be apparent to the person skilled in the art, various modifications and amendments can be made without departing from the scope of the present invention, as defined in the appended claims.

The invention claimed is:

1. A method of routing a call made by a calling party to a fixed telephone number of a called party, the fixed telephone number being associated with a subscriber, the method comprising checking whether a first mobile terminal associated with the subscriber is available to receive the call in an area covered by a wireless access point, and
if so routing the call to the first mobile terminal via an Internet Protocol (IP) network and a wireless access point associated with said fixed telephone number, and
if not, determining whether an indicator associated with said fixed number indicates that the call can be charged to the called party,
if the indicator indicates that the call can be charged to the called party, routing said call to the first mobile terminal via a mobile telephone network, and
if the indicator does not indicate that the call can be charged to the called party, routing the call to a predetermined alternative terminating point, the alternative terminating point being different from the first mobile terminal.

2. The method according to claim 1 wherein said predetermined alternative terminating point comprises an answering service.

3. The method according to claim 1, wherein said predetermined alternative terminating point comprises a terminal other than the first mobile terminal or a terminal associated with the fixed telephone number.

4. The method according to claim 1, further comprising:
if the first mobile terminal is not available to receive the call in the area, determining whether a second mobile terminal associated with said fixed telephone number is available to receive the call in the area covered by the wireless access point; and
if the second mobile terminal is available to receive the call in the area covered by the wireless access point, routing said call to the second mobile terminal instead of routing said call to the predetermined alternative terminating point.

5. The method according to claim 1, further comprising:
checking whether a second mobile terminal associated with the subscriber available to receive the call in the area covered by the wireless access point, and
if the second mobile terminal is available to receive the call and independent of whether the first mobile terminal is available to receive the call, routing said call to the second mobile terminal.

6. The method according to claim 1, further comprising:
if the indicator does not indicate that the call can be charted to the called party, determining whether said calling party is on a hot list; and
if said calling party is on the hot list, routing said call to the first mobile terminal via the mobile telephone network instead of routing said call to the predetermined alternative terminating point.

7. The method according to claim 1, wherein if said calling party is calling with a calling party mobile terminal, said call is routed via said IP network only if said calling party mobile terminal is connected via a further wireless access point.

8. The method according to claim 1, wherein checking whether the first mobile terminal is available to receive the call in said area includes receiving information on whether the first mobile terminal is located in said area from a Home Base Station Controller.

9. The method according to claim 1, wherein checking whether the first mobile terminal is available to receive the call in said area includes receiving information on whether the first mobile terminal is located in said area from a Home Location Register by means of subscription or Any Time Interrogation.

10. The method according to claim 1, wherein checking whether the first mobile terminal is available to receive the call in said area includes receiving information on whether the first mobile terminal is located in said area from a Secure Gateway.

11. A service node for use in a telecommunication network, said Service node being arranged to receive a request for setting up a connection from a Telephony switch of a fixed telephone network and to send a connection message to said Telephony switch, said Service node being arranged to store for each of a plurality of subscribers:
a fixed telephone number,
information identifying one or more related areas associated with said fixed telephone number, and
a list comprising identities of one or more associated terminating points and a predetermined alternative terminating point, and for each associated terminating point an area presence indicator, said Service node further being arranged to:
receive entry/exit triggers from an area presence service capable of detecting entry in and exit from said one or more related areas by said one or more associated terminating points;
update said area presence indicators based on received entry/exit triggers so that when an entry trigger is received, the area presence indicator is given a value 'in' and when an exit trigger is received, the area presence indicator is given a value 'out';
determine said connection message by using a first associated terminating point in said list for which the associated area presence indicator has a value 'in', or, in case none of the associated terminating points has a presence indicator with value 'in', by using a predetermined alternative terminating point; and
send the connection message to said Telephony switch.

12. The service node according to claim 11, wherein said Service node comprises a Service Data Point for storing said list.

13. The service node according to claim 11, wherein said list comprising one or more associated terminating points associated with said fixed telephone number is sorted in a predefined order of priority.

14. The service node according to claim 11, wherein said list comprises said predetermined alternative terminating point having an area presence indicator with a fixed "in" value.

15. The service node according to claim 11, wherein said Service node comprises a Service Control Point.

16. A telecommunications network comprising:
the Service node of claim 11;
the fixed telephone network comprising the Telephony switch from which the request for setting up a connection is received by said Service node;
an IP network in communication with said telephony switch;
one or more wireless access points in communication with said IP network, said wireless access points being arranged to connect telephone calls received from said IP network via WIFI/WLAN to the one or more associated terminating points.

17. The telecommunication network according to claim 16, further comprising a Security Gateway in communication with said Service node and arranged to send said entry/exit triggers to said Service node, said telecommunication network further comprising a media gateway, wherein said one or more mobile terminals may be connected via said Security Gateway and said media gateway to the Telephony switch.

18. The telecommunication network according to claim 17, further comprising a Home Base Station Controller connected to said Secure Gateway and said mobile telephone network, wherein said Home Base Station Controller is arranged to provide entry/exit status information on requests by said Service node.

19. A telecommunication network having a Service node, said Service node being arranged to receive a request for setting up a connection from a Telephony switch of a fixed telephone network and to send a connection message to said Telephony switch, said Service node being arranged to store for each of a plurality of subscribers:
- a fixed telephone number;
- information identifying one or more related areas associated with said fixed telephone number; and
- a list comprising identities of one or more associated terminating points and a predetermined alternative terminating point, and for each associated terminating point an area presence indicator, said Service node further being arranged to:
  - receive entry and exit triggers from an area presence service capable of detecting entry in and exit from said one or more related areas by said one or more associated terminating points;
  - update said area presence indicators based on received entry and exit triggers so that when an entry trigger is received, the area presence indicator is given a value 'in' and when an exit trigger is received, the area presence indicator is given a value 'out';
  - determine said connection message by using a first associated terminating point in said list for which the associated area presence indicator has a value 'in', or, in case none of the associated terminating points has a presence indicator with value 'in', by using a predetermined alternative terminating point; and
  - send the connection message to said Telephony switch.

20. The telecommunication network according to claim 17, wherein said Service node comprises a Service Data Point for storing said list.

21. The telecommunication network according to claim 17, wherein said list comprising one or more associated terminating points associated with said fixed telephone number is sorted in a predefined order of priority.

22. The telecommunication network according to claim 17, wherein said list comprises said predetermined alternative terminating point having an area presence indicator with a fixed "in" value.

23. The telecommunication network according to claim 17, wherein said Service node comprises a Service Control Point.

* * * * *

UNITED STATES PATENT AND TRADEMARK OFFICE
CERTIFICATE OF CORRECTION

| | |
|---|---|
| PATENT NO. | : 8,571,563 B2 |
| APPLICATION NO. | : 12/513142 |
| DATED | : October 29, 2013 |
| INVENTOR(S) | : Bot et al. |

It is certified that error appears in the above-identified patent and that said Letters Patent is hereby corrected as shown below:

In the Specification:

In Column 3, Line 18, delete "assess" and insert -- access --, therefor.

In Column 3, Line 60, delete "as a" and insert -- as an --, therefor.

In Column 5, Line 22, delete "an other" and insert -- another --, therefor.

In Column 5, Line 67, delete "a alternative" and insert -- an alternative --, therefor.

In Column 7, Line 10, delete "Mobile station 34." and insert -- mobile terminal 34. --, therefor.

In the Claims:

In Column 9, Lines 8-9, in Claim 1, delete "comprising" and insert -- comprising: --, therefor.

In Column 9, Line 28, in Claim 2, delete "claim 1" and insert -- claim 1, --, therefor.

In Column 9, Line 48, in Claim 5, delete "subscriber" and insert -- subscriber is --, therefor.

In Column 9, Line 55, in Claim 6, delete "charted" and insert -- charged --, therefor.

Signed and Sealed this
Fifteenth Day of July, 2014

Michelle K. Lee
*Deputy Director of the United States Patent and Trademark Office*